US012071162B2

United States Patent
Pedersen et al.

(10) Patent No.: US 12,071,162 B2
(45) Date of Patent: Aug. 27, 2024

(54) PULL-OVER LOCATION SELECTION USING MACHINE LEARNING

(71) Applicant: Waymo LLC, Mountain View, CA (US)

(72) Inventors: Jonathan Lee Pedersen, Brooklyn, NY (US); Yu Zheng, Milpitas, CA (US); Eamonn Michael Doherty, Mountain View, CA (US); Brian Clair Williammee, Santa Cruz, CA (US); Kevin Joseph Malta, San Francisco, CA (US); Chung Eun Kim, San Mateo, CA (US); Xu Dong, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 352 days.

(21) Appl. No.: 17/491,068

(22) Filed: Sep. 30, 2021

(65) Prior Publication Data
US 2023/0099334 A1    Mar. 30, 2023

(51) Int. Cl.
*B60W 60/00*    (2020.01)
*B60W 30/18*    (2012.01)
(Continued)

(52) U.S. Cl.
CPC ...... *B60W 60/0016* (2020.02); *B60W 30/181* (2013.01); *B60W 40/06* (2013.01);
(Continued)

(58) Field of Classification Search
CPC .......... B60W 60/0016; B60W 30/181; B60W 40/06; B60W 2552/45; B60W 2555/60;
(Continued)

(56) References Cited

U.S. PATENT DOCUMENTS 9,547,307 B1    1/2017    Cullinane et al.
9,821,807 B2    11/2017    Herbach et al.
(Continued)

OTHER PUBLICATIONS

Cicek et al., "Fully Automated Roadside Parking Spot Detection in Real Time with Deep Learning," Concurrency and Computation Practice and Experience, Sep. 2000, 13 pages.
(Continued)

*Primary Examiner* — Isaac G Smith
*Assistant Examiner* — Nikki Marie M Molina
(74) *Attorney, Agent, or Firm* — Fish & Richardson P.C.

(57) ABSTRACT

Methods, systems, and apparatus, including computer programs encoded on a computer storage medium, for selecting a pull-over location using machine learning. One of the methods includes obtaining data specifying a target pull-over location for an autonomous vehicle travelling on a roadway. A plurality of candidate pull-over locations in a vicinity of the target pull-over location are identified. For each candidate pull-over location, an input that includes features of the candidate pull-over location is processed using a machine learning model to generate a respective likelihood score representing a predicted likelihood that the candidate pull-over location is an optimal location. The features of the candidate pull-over location include one or more features that compare the candidate pull-over location to the target pull-over location. Using the respective likelihood scores, one of the candidate pull-over locations is selected as an actual pull-over location for the autonomous vehicle.

20 Claims, 4 Drawing Sheets

(51) Int. Cl.
*B60W 40/06* (2012.01)
*G06N 20/00* (2019.01)

(52) U.S. Cl.
CPC ......... *G06N 20/00* (2019.01); *B60W 2552/45* (2020.02); *B60W 2555/60* (2020.02)

(58) Field of Classification Search
CPC ... B60W 60/0011; G06N 20/00; G06N 3/044; G06N 3/084; G06N 5/01; G06N 20/10; G06N 20/20
See application file for complete search history.

(56) References Cited

U.S. PATENT DOCUMENTS

| | | | |
|---|---|---|---|
| 10,331,129 B2* | 6/2019 | Iagnemma | B60W 60/0053 |
| 11,062,602 B1* | 7/2021 | Beaurepaire | G08G 1/146 |
| 2004/0020699 A1* | 2/2004 | Zalila | B62D 15/0285 |
| | | | 180/204 |
| 2018/0079422 A1* | 3/2018 | Weinstein-Raun | G08G 1/127 |
| 2018/0304926 A1* | 10/2018 | Ghose | B62D 15/0285 |
| 2021/0053567 A1* | 2/2021 | Dyer | G05D 1/0088 |
| 2022/0073099 A1* | 3/2022 | Park | B60W 30/146 |
| 2022/0410890 A1* | 12/2022 | Takei | B60W 30/09 |

OTHER PUBLICATIONS

Goren et al., "On-Street Parking Spot Detection for Smart Cities," 2019 IEEE International Smart Cities Conference, Oct. 2019, 4 pages.

* cited by examiner

PULL-OVER LOCATION SELECTION USING MACHINE LEARNING

BACKGROUND

This specification relates to autonomous vehicles.

Autonomous vehicles include self-driving cars, boats, and aircrafts. Autonomous vehicles use a variety of on-board sensors and computer systems to detect nearby objects and use such detections to make control and navigation decisions.

Some autonomous vehicles have on-board computer systems that implement neural networks, other types of machine learning models, or both for various prediction tasks, e.g., object classification within images. For example, a neural network can be used to determine that an image captured by an on-board camera is likely to be an image of a nearby car.

Autonomous and semi-autonomous vehicle systems can use full-vehicle predictions for making driving decisions. A full-vehicle prediction is a prediction about a region of space that is occupied by a vehicle. The predicted region of space can include space that is unobservable to a set of on-board sensors used to make the prediction.

Autonomous vehicle systems can make full-vehicle predictions using human-programmed logic. The human-programmed logic specifies precisely how the outputs of on-board sensors should be combined, transformed, and weighted, in order to compute a full-vehicle prediction.

SUMMARY

This specification describes systems and techniques for selecting a location for an autonomous vehicle travelling on a roadway to pull-over when the autonomous vehicle receives a target pull-over location. Pulling-over is defined as temporarily stopping at least partially outside of the flow of the traffic by a vehicle. For example, a vehicle may pull over by temporarily stopping outside of the driving lane to pick up a passenger. The selected pull-over location is a location selected from a set of candidate locations near the target location, that is predicted by a machine learning model to be the location that satisfies certain criteria, e.g., easy to pull over, has less impact on on-going traffic, and is close to the target pull-over location. For example, the selected pull-over location can be a pull-over location that a human driver would choose.

In general, one innovative aspect of the subject matter described in this specification can be embodied in methods that include the actions of obtaining data specifying a target pull-over location for an autonomous vehicle travelling on a roadway; identifying a plurality of candidate pull-over locations in a vicinity of the target pull-over location; for each of the plurality of candidate pull-over locations, processing an input that includes features of the candidate pull-over location using a machine learning model to generate a respective likelihood score for the candidate pull-over location, each likelihood score representing a predicted likelihood that the candidate pull-over location is an optimal location for the autonomous vehicle to pull-over, wherein the features of the candidate pull-over location include one or more features that compare the candidate pull-over location to the target pull-over location; and selecting, using the respective likelihood scores, one of the candidate pull-over locations as an actual pull-over location for the autonomous vehicle. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The actions further include generating the plurality of candidate pull-over locations by identifying a plurality of waypoints within a region in a vicinity of the autonomous vehicle. The one or more features that compare the candidate pull-over location to the target pull-over location include a distance from the candidate pull-over location to the target pull-over location. The features of the candidate pull-over location include a distance from the candidate pull-over location to an edge of the roadway. The features of the candidate pull-over location includes one or more features that each measures a distance from the candidate pull-over location to a corresponding type of road feature at which vehicles are not permitted to stop. The one or more features that each measures a distance from the candidate pull-over location to a corresponding type of road feature at which vehicles are not permitted to stop include: a distance from the candidate pull-over location to a driveway. The driveway is an unmapped driveway. The one or more features that each measures a distance from the candidate pull-over location to a corresponding type of road feature at which vehicles are not permitted to stop include: a distance from the candidate pull-over location to a fire hydrant. The one or more features that each measures a distance from the candidate pull-over location to a corresponding type of road feature at which vehicles are not permitted to stop include: a distance from the candidate pull-over location to a crosswalk. The features of the candidate pull-over location includes one or more features that each measures a position of the autonomous vehicle if the autonomous vehicle pulls over at the candidate pull-over location. The one or more features that measure a position of the autonomous vehicle if the autonomous vehicle pulls over at the candidate pull-over location include: an angle of the autonomous vehicle relative to an edge of the roadway if the autonomous vehicle pulls over at the candidate pull-over location. The one or more features that measure a position of the autonomous vehicle if the autonomous vehicle pulls over at the candidate pull-over location include: an angle of the autonomous vehicle relative to a baseline if the autonomous vehicle pulls over at the candidate pull-over location, wherein the baseline is a line where the autonomous vehicle drives without pulling over. The one or more features that measure a position of the autonomous vehicle if the autonomous vehicle pulls over at the candidate pull-over location include: a lateral distance from a pull-over location to a baseline, wherein the pull-over location is a location while the autonomous vehicle is pulling over to the candidate pull-over location to arrive at a pulled-over location that is as close to an edge of the roadway as possible, wherein the baseline is a line where the autonomous vehicle drives without pulling over. The one or more features that measure a position of the autonomous vehicle if the autonomous vehicle pulls over at the candidate pull-over location include: a width of a corridor that other vehicles on the roadway pass the autonomous vehicle after the autonomous vehicle is pulled over at the candidate pull-over location. The one or more features that measure a position of the autonomous vehicle if the autonomous vehicle pulls over at the candidate pull-over location include: data indicating whether the autonomous vehicle is double parked after the autonomous vehicle is pulled over at the candidate pull-over location. The machine learning model is a binary classification model.

Particular embodiments of the subject matter described in this specification can be implemented so as to realize one or more of the following advantages.

Users, e.g., riders of the vehicle or users seeking to enter the vehicle, can request that a vehicle pull-over at a target location. However, pulling over at the target location, e.g., to let rider(s) enter or exit the vehicle may not be feasible because pulling over at the target location may be not easy, may have a significant impact on on-going traffic, or may not be permitted. The systems and techniques can automatically select, using a trained machine learning model, a pull-over location for an autonomous vehicle travelling on a roadway to pull-over based on a received target pull-over location. The selected pull-over location is a location selected from a plurality of candidate pull-over locations near the target location, and is a location that is predicted by the machine learning model to be the location that satisfies certain criteria. The certain criteria includes a location where vehicles are permitted to stop, is easy to pull over, has less impact on on-going traffic, and is close to the target pull-over location. Rather than using a heuristically determined cost function of features of each candidate pull-over location, the machine learning model can be trained on training data to process an input that includes the features of each candidate pull-over location and can generate a likelihood score for each candidate pull-over location that represents a predicted likelihood that the candidate pull-over location is an optimal location for the autonomous vehicle to pull-over. By selecting an actual pull-over location for the autonomous vehicle based on the respective likelihood scores of the candidate pull-over locations, the systems and techniques can select better pull-over locations than the techniques that use heuristically determined cost function. As the system collects more training data, the system can continuously improve the performance of the machine learning model by training the machine learning model with more training data.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
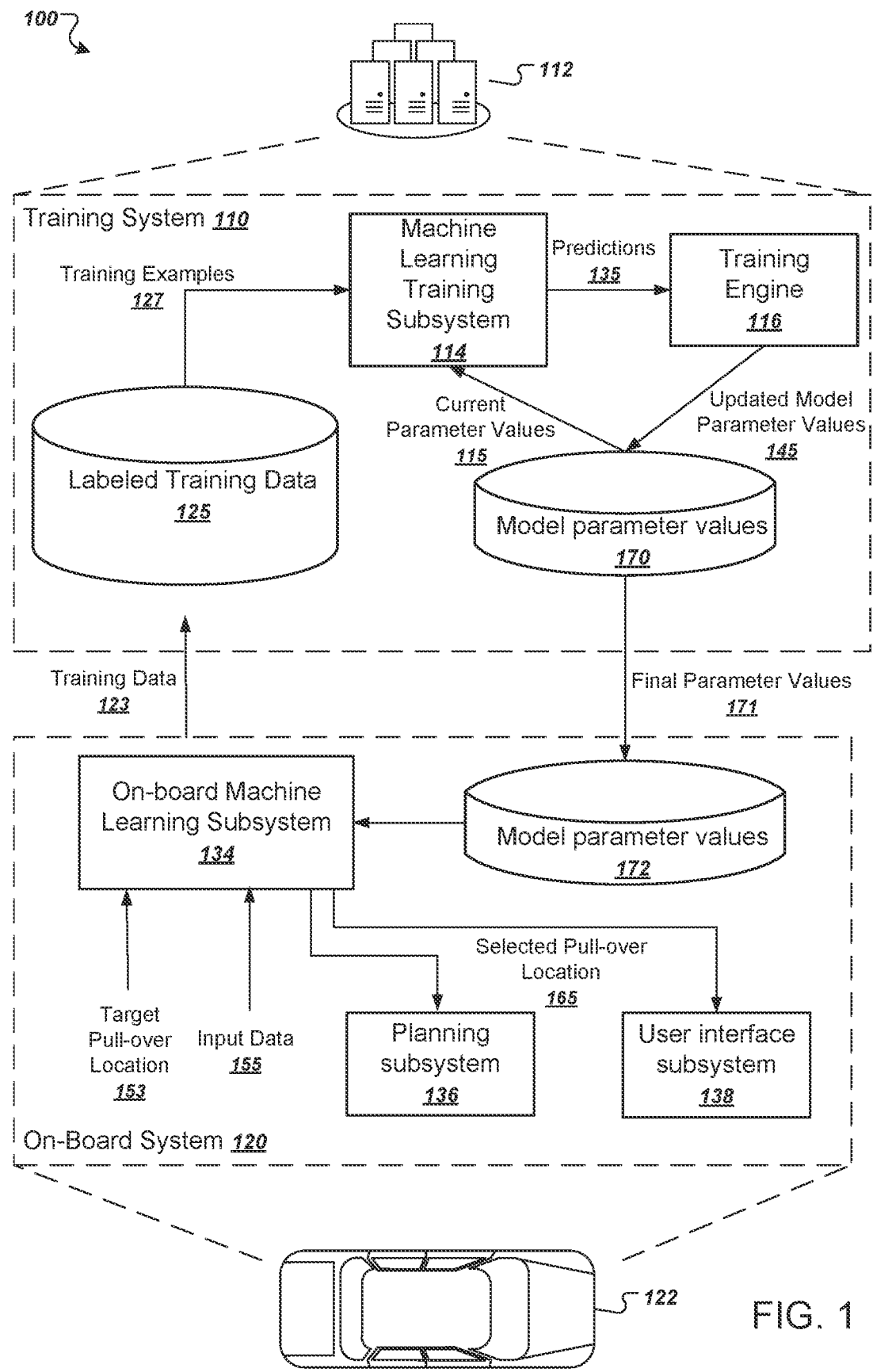
FIG. 1 is a diagram of an example system.

FIG. 1 is a diagram of an example system 100. The system 100 includes a training system 110 and an on-board system 120.

The on-board system 120 is physically located on-board a vehicle 122. Being on-board the vehicle 122 means that the on-board system 120 includes components that travel along with the vehicle 122, e.g., power supplies, computing hardware, and sensors. The vehicle 122 in FIG. 1 is illustrated as an automobile, but the on-board system 120 can be located on-board any appropriate vehicle type.

During operation of the vehicle 122, the on-board system 120 obtains data specifying a target pull-over location 153. Pulling-over is defined as temporarily stopping at least partially outside of the flow of the traffic by a vehicle. For example, a vehicle may pull over by temporarily stopping outside of the driving lane to pick up a passenger. The target pull-over location 153 is a desired location that the vehicle can temporarily stop on the side of a road, e.g., to pick up or drop off a passenger or packages. For example, the vehicle 122 can receive, from a passenger, an address of a destination, and the location of the destination corresponding to the address of the destination is a target pull-over location 153. As another example, the vehicle can be a taxi that is going to pick up a passenger at a particular pick up location, and the particular pick up location is the target pull-over location 153. As another example, a user can select the target pull-over location 153 from a predetermined set of locations in the vicinity of the address or landmark that the user entered, using a software application (APP) installed on a mobile device of the user, and the mobile device can send the selected target pull-over location 153 to the vehicle 122.

The target pull-over location 153 can be anywhere in the environment, e.g., a location on the roadway, on or near an edge of the road, at a building, and so on. In some implementations, the target pull-over location 153 can be a location specified by a user on a map of the environment. For example, a user can specify the target pull-over location 153 by touching a screen of a mobile device that displays a map of the environment. In some implementations, the target pull-over location 153 can be a location determined by an application running in a user device, e.g., a mobile phone, based on a user's desired location. For example, the target pull-over location 153 can be a location (i) where vehicles are permitted to stop when the road is empty, and (ii) is within a short walking distance to the desired location identified by a user. The target pull-over location 153 can be a location where vehicles are permitted to stop or can be a location where vehicles are not permitted to stop. The target pull-over location 153 can be a location in a parking lot, or can be a location near the roadway where street parking is required. However, the target pull-over location may not be a preferred pull-over location for many possible reasons. For example, although the target pull-over location may be a location where vehicles are permitted to stop when the road is empty, the target location may currently be occupied by another vehicle or otherwise temporarily blocked and the autonomous vehicle might need to choose a different location near the target pull-over location to avoid double parking. Therefore, it is desirable to identify an actual pull-over location that is at a location where vehicles are permitted to stop, is easy to pull over, has less impact on on-going traffic, and is close to the target pull-over location 153.

The on-board system 120 identifies a plurality of candidate pull-over locations in the vicinity of the target pull-over location. For example, the on-board system 120 can identify a plurality of candidate pull-over locations, and each candidate pull-over location can be on the side of a road and is within a predetermined distance from the target pull-over location.

In some implementations, the on-board system 120 can generate the plurality of candidate pull-over locations by identifying a plurality of waypoints within a region in a vicinity of the autonomous vehicle 122. For example, the on-board system 120 can divide the road into a set of waypoints that have a predetermined interval from each other, e.g., at 0.5 meter from each other. The on-board system 120 can determine a plurality of waypoints from the set of waypoints where the vehicle 122 might be able to pull over. The plurality of waypoints can be waypoints that are within a first predetermined distance from the autonomous vehicle and within a second predetermined distance from the target pull-over location. The plurality of waypoints can be the candidate pull-over locations where the vehicle 122 might pull over in response to receiving the target pull-over location 153.

For each of the plurality of candidate pull-over locations, the on-board system 120 can determine features of the candidate pull-over location. The on-board system 120 can provide input data 155 to an on-board machine learning subsystem 134, and the input data 155 can include the features of the candidate pull-over locations. Generally, the features of a given candidate pull-over location characterize the location relative to the target location and the current traffic condition on the roadway.

The on-board machine learning subsystem 134 is a subsystem that implements a pull-over location prediction machine learning model. The machine learning model can be a linear binary classification model, a decision tree, a random forest, a support vector machine (SVM), a neural network model, e.g., a recurrent neural network model, and so on. The on-board machine learning subsystem 134 implements the operations of the machine learning model, e.g., operations of each layer of a neural network, that has been trained to predict the selected pull-over location 165. The on-board machine learning subsystem 134 includes one or more computing devices having software or hardware modules that implement the respective operations of a machine learning model, e.g., operations of a neural network according to an architecture of the neural network.

The on-board machine learning subsystem 134 can implement the operations of a machine learning model by loading a collection of model parameter values 172 that are received from the training system 110. Although illustrated as being logically separated, the model parameter values 172 and the software or hardware modules performing the operations may actually be located on the same computing device or, in the case of an executing software module, stored within the same memory device.

The on-board machine learning subsystem 134 can use hardware acceleration or other special-purpose computing devices to implement the operations of a machine learning model. For example, some operations of some layers of a neural network model may be performed by highly parallelized hardware, e.g., by a graphics processing unit or another kind of specialized computing device. In other words, not all operations of each layer need to be performed by central processing units (CPUs) of the on-board machine learning subsystem 134.

The on-board machine learning subsystem 134 generates a selected pull-over location 165 by processing input data 155, i.e., the features of each of the candidate pull-over locations, using a machine learning model. The machine learning model can generate a respective likelihood score for the candidate pull-over location that represents a predicted likelihood that the candidate pull-over location is an optimal location for the autonomous vehicle to pull-over. For example, the machine learning model can be a binary classification model that can generate a probability that the candidate pull-over location is an optimal pull-over location, e.g., a probability of 0.7. The on-board machine learning subsystem 134 can select, using the respective likelihood score, one of the candidate pull-over locations as an actual pull-over location for the autonomous vehicle. For example, the machine learning model can generate a respective likelihood score for each of two candidate pull-over locations, e.g., 0.5 and 0.8. The on-board machine learning subsystem 134 can select the candidate pull-over location that corresponds to the likelihood score of 0.8 because it is more likely that this candidate pull-over location is an optimal pull-over location.

In some implementations, the system can process features of two or more candidate pull-over locations using the machine learning model to select an actual pull-over location for the autonomous vehicle. The machine learning model can be trained to process context information of the neighboring candidate pull-over locations in parallel and to generate likelihood scores for the two or more candidate pull-over locations.

The on-board machine learning subsystem 134 can provide the selected pull-over location 165 to a planning subsystem 136, a user interface subsystem 138, or both.

When a planning subsystem 136 receives the selected pull-over location 165, the planning subsystem 136 can use the selected pull-over location 165 to make fully-autonomous or semi-autonomous driving decisions. For example, the planning subsystem 136 can generate a fully-autonomous plan to determine a trajectory that the vehicle 122 can pull over from its current location to the selected pull-over location 165.

A user interface subsystem 138 can receive the selected pull-over location 165 and can generate a user interface presentation that indicates the selected pull-over location 165. For example, the user interface subsystem 138 can generate a user interface presentation having image or video data containing a representation of the selected pull-over location 165, e.g., an image of the environment with an icon indicating the selected pull-over location 165. An on-board display device can then display the user interface presentation to passengers of the vehicle 122.

The on-board machine learning subsystem 134 can also use the input data 155 to generate training data 123. The on-board system 120 can provide the training data 123 to the training system 110 in offline batches or in an online fashion, e.g., continually whenever it is generated.

The training system 110 is typically hosted within a data center 112, which can be a distributed computing system having hundreds or thousands of computers in one or more locations.

The training system 110 includes a machine learning training subsystem 114 that can implement the operations of a machine learning model that is designed to generate a likelihood score for a candidate pull-over location from input data describing the features of the candidate pull-over location. The machine learning training subsystem 114 includes a plurality of computing devices having software or hardware modules that implement the respective operations of a machine learning model.

The training machine learning model generally has the same model architecture as the on-board machine learning model. However, the training system 110 need not use the same hardware to compute the operations of each layer. In other words, the training system 110 can use CPUs only, highly parallelized hardware, or some combination of these.

The machine learning training subsystem 114 can compute the operations of the machine learning model using current parameter values 115 stored in a collection of model parameter values 170. Although illustrated as being logically separated, the model parameter values 170 and the software or hardware modules performing the operations may actually be located on the same computing device or on the same memory device.

The training system 110 or the on-board system 120 can generate labeled training data 125 from the training data 123. The labeled training data 125 includes training examples 127, and each training example includes a training input and a label. Each training input corresponds to a candidate pull-over location and includes features of the candidate pull-over location. For example, a given training input can include one or more features that compare the candidate pull-over location to the target pull-over location.

A label for a training input can be a label indicating whether the candidate pull-over location is an optimal pull-over location relative to a target pull-over location, e.g., a binary label of TRUE or FALSE. In some implementations, a label for a training input can be a value indicating the likelihood score that the candidate pull-over location is an optimal pull-over location relative to the target pull-over location, e.g., a score within the range of [0, 1]. In some implementations, a human labeler can generate data indicating an optimal pull-over location. For example, a human labeler can generate a bounding box label indicating that the region inside the bounding box includes one or more optimal pull-over locations. In some implementations, the system can obtain log data of one or more vehicles driven by one or more human drivers and can generate ground truth data indicating optimal pull-over locations based on pull-over locations selected by the one or more human drivers.

The system can determine the label for a candidate pull-over location by comparing the candidate pull-over location to the bounding box. For example, if a candidate pull-over location is inside the bounding-box or the middle portion of the bounding-box, the system can determine that the candidate pull-over location is an optimal pull-over location, e.g., the label can be TRUE. If a candidate pull-over location is outside the bounding-box or the middle portion of the bounding-box, the system can determine that the candidate pull-over location is not an optimal pull-over location, e.g., the label can be FALSE.

The machine learning training subsystem 114 trains a machine learning model on the labeled training data 125, e.g., using a supervised training method. The machine learning training subsystem 114 can select a set of training examples 127 from the labeled training data 125. The machine learning training subsystem 114 can generate, for each training example 127, a prediction 135 including a likelihood score for the training input that represents a predicted likelihood that the candidate pull-over location is an optimal location for an autonomous vehicle to pull-over. A training engine 116 analyzes the predictions 135 and compares the predictions to the pull-over location ground truth labels in the training examples 127.

The training engine 116 then generates updated model parameter values 145 by using an appropriate updating technique, e.g., stochastic gradient descent with backpropagation. The training engine 116 can then update the collection of model parameter values 170 using the updated model parameter values 145.

After training is complete, the training system 110 can provide a final set of model parameter values 171 to the on-board system 120 for use in making fully autonomous or semi-autonomous driving decisions. The training system 110 can provide the final set of model parameter values 171 by a wired or wireless connection to the on-board system 120.

Figure 2:
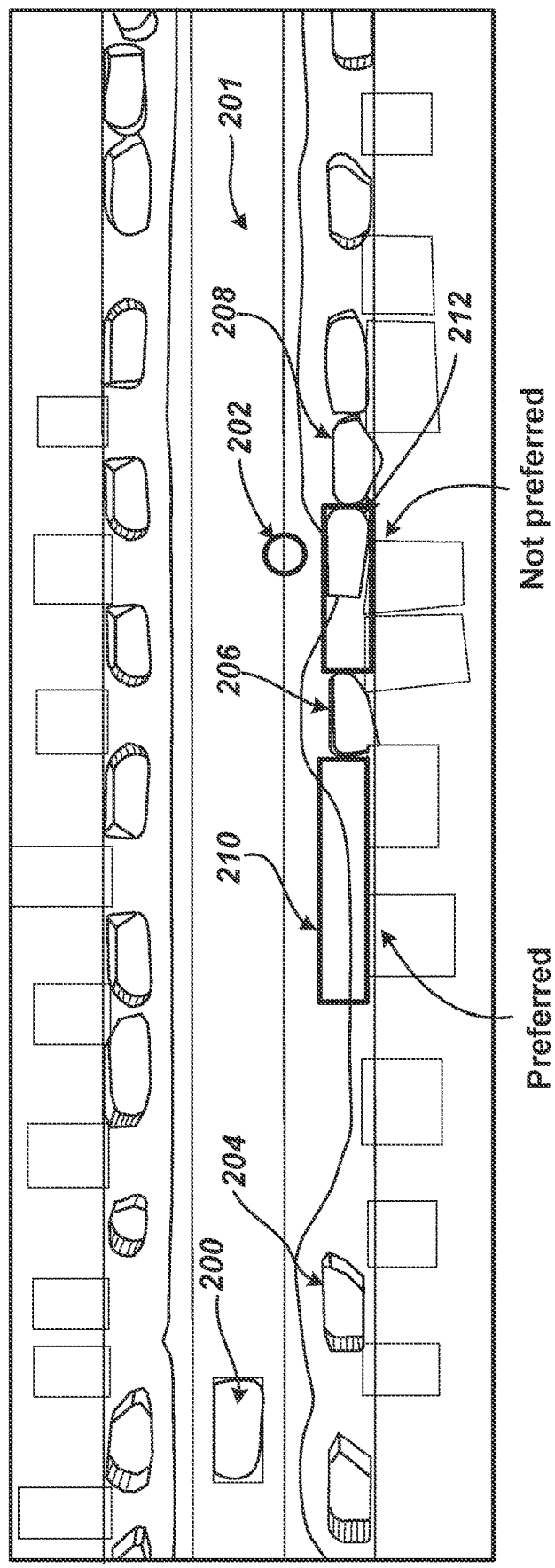
FIG. 2 illustrates an example of selecting a pull-over location.

FIG. 2 illustrates an example of selecting a pull-over location for a vehicle 200 to pull-over. The vehicle 200 travels on a roadway 201 and receives data specifying a target pull-over location 202. For example, the vehicle 200 can receive the three dimensional location of the target pull-over location 202. The target pull-over location 202 can be a desired location where the vehicle may stop to perform an activity, e.g., picking up or dropping off a passenger, delivering a meal, picking up or dropping off packages.

However, the vehicle may not actually stop at the target pull-over location 202 for various reasons. Even if the target pull-over location 202 is a location where vehicles are permitted to stop, it may not be desirable to pull over to the target pull-over location 202 given the current state of the roadway. For example, given the current traffic on the roadway or the vehicles currently parked along the roadway or given other temporary obstructions to the roadway, it may not be desirable to pull over to the target pull-over location 202.

In some implementations, the target pull-over location can be a location where vehicles are not permitted to stop. For example, as shown in FIG. 2, the target pull-over location 202 can be near the middle of the roadway 201 and can be far away from the curb of the roadway where vehicles are not permitted to stop. In some implementations, the target pull-over location 202 can be a location where it may not be easy for the vehicle 200 to pull over. For example, the target pull-over location 202 is next to vehicles 206 and 208 that are parked along the side of the road, and the available space between the vehicle 206 and the vehicle 208 may not be sufficient or may not be easy for the vehicle 200 to pull over. Pulling over at the target pull-over location 202 may have a significant impact on on-going traffic. For example, the target pull-over location 202 is far away from the edge of the road, and the vehicle 200 might block the on-going vehicles after it is pulled-over at the target pull-over location 202.

The on-board system of the vehicle 200 can determine a plurality of candidate pull-over locations. For example, the on-board system can determine a first candidate pull-over location 210 and a second candidate pull-over location 212. Although the second candidate pull-over location 212 is closer to the target pull-over location 202, the first candidate pull-over location 210 might be a better choice, e.g., because the vehicle 200 can more easily pull over to the first candidate pull-over location 210 because there is a large space available between parked vehicles 204 and 206. Also, because the vehicle 200 can directly drive into the first candidate pull-over location 210, without a need to maneuver back and forth or to perform a parallel parking, pulling-over at the first candidate pull-over location 210 can have less impact on on-going traffic that is travelling on the roadway 201.

For each of the plurality of candidate pull-over locations, the on-board system of the vehicle 200 can process an input that includes features of the candidate pull-over location using a machine learning model. The features of the candidate pull-over location can include a distance from the candidate location to the target pull-over location 202, a distance from the candidate location to the edge of the roadway, a distance from the candidate pull-over location to a driveway or a fire hydrant, an angle of the vehicle 200 to the edge of the roadway if the vehicle pulls over at the candidate location, and so on.

For example, the features of the candidate pull-over location 210 can include a distance, e.g., 50 meters, from the candidate location 210 to the target pull-over location 202, and a pull-over angle of 20 degrees if the vehicle 200 pulls over at the candidate pull-over location 210. The features of the candidate pull-over location 212 can include a distance, e.g., 5 meters, from the candidate location 212 to the target pull-over location 202, and a pull-over angle of 45 degrees if the vehicle 200 pulls over at the candidate pull-over location 212.

The on-board system of the vehicle 200 can generate, using the machine learning model, respective likelihood scores for each of the plurality of candidate pull-over locations. For example, the on-board system can generate a likelihood score of 0.9 for the first candidate pull-over location 210. The on-board system can generate a likelihood score of 0.7 for the second candidate pull-over location 212. This means that the second candidate pull-over location 212 is less likely to be an optimal pull-over location than the first candidate pull-over location 210.

The on-board system of the vehicle 200 can select, using the respective likelihood scores, one of the candidate pull-over locations as an actual pull-over location of the vehicle 200. For example, the on-board system of the vehicle 200 can select the candidate pull-over location that has the highest likelihood score, e.g., the first candidate pull-over location 210 that has a likelihood score of 0.9.

In some implementations not depicted in FIG. 2, the first candidate pull-over location 210 might be near a road feature at which vehicles are not permitted to stop, e.g., near a fire hydrant. Even though it is easier to pull over to the first candidate pull-over location 210, the on-board system of the vehicle 200 may select the second candidate pull-over location 212 because vehicles are not permitted to stop at the first candidate pull-over location 210 that is near a road feature at which vehicles are not permitted to stop.

Figure 3:
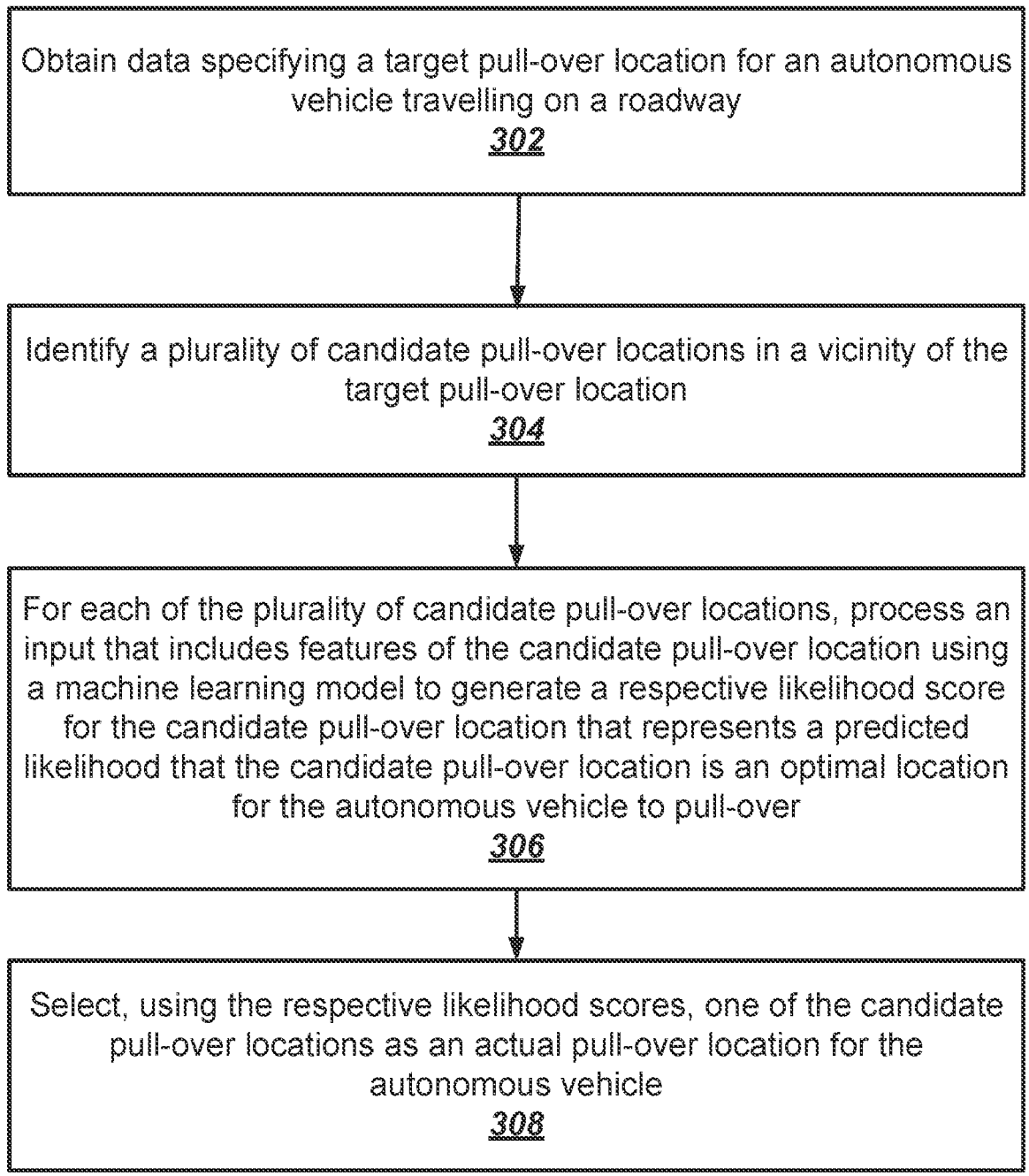
FIG. 3 is a flow chart of an example process for selecting a pull-over location using machine learning.

FIG. 3 is a flow chart of an example process 300 for selecting a pull-over location using machine learning. The example process in FIG. 3 uses a forward inference pass through a machine learning model that has already been trained to select a pull-over location. The example process can thus be used to make predictions from unlabeled input, e.g., in a production system. The process will be described as being performed by a system of one or more computers in one or more locations, appropriately programmed in accordance with this specification. For example, the system can be an on-board system located on-board a vehicle, e.g., the on-board system 120 of FIG. 1.

The system obtains data specifying a target pull-over location for an autonomous vehicle travelling on a roadway (302). The target pull-over location can be a target location for the autonomous vehicle to temporarily stop on the side of the roadway. For example, the system can receive a target pull-over location for an autonomous vehicle to pick up a passenger. The target pull-over location can be a location specified by the future passenger on a map.

The system identifies a plurality of candidate pull-over locations in a vicinity of the target pull-over location (304). The candidate pull-over locations can include regular parking locations, temporary parking locations, or other locations on the roadway where vehicles may temporarily make a stop. For example, the system can search within a predetermined distance from the target pull-over location, available parking spots along the side of the roadway. The system can identify these available parking spots as candidate pull-over locations.

In some implementations, the system can generate the plurality of candidate pull-over locations by identifying a plurality of waypoints within a region in a vicinity of the autonomous vehicle. Rather than computing too many candidate points on the road, the system can divide the roadway into a plurality of waypoints at a predetermined interval. The system can select a plurality of waypoints that are (i) within a region in the vicinity of the autonomous vehicle and (ii) in the vicinity of the target pull-over location, and (iii) at a location where a vehicle might be able to pull over, e.g., a location corresponding to an available parking spot. The system can identify the plurality of waypoints as the plurality of candidate pull-over locations.

For example, the system can divide the roadway into waypoints that are 0.5 meters from each other. The system can identify a few waypoints that are (i) within 100 meters from the target location, (ii) within 500 meters from the autonomous vehicle, and (ii) at locations where a vehicle might pull-over.

For each of the plurality of candidate pull-over locations, the system processes an input that includes features of the candidate pull-over location using a machine learning model to generate a respective likelihood score for the candidate pull-over location (306). The respective likelihood score represents a predicted likelihood that the candidate pull-over location is an optimal location for the autonomous vehicle to pull-over.

Generally, the features of a given candidate pull-over location characterize the location relative to the target location and the current traffic condition on the roadway. The onboard system can compute these features using sensor data generated by sensors of the vehicle, e.g., images captured by one or more cameras, point cloud data captured by one or more lidar sensors, and so on. The on-board system of the autonomous vehicle can detect one or more objects in the environment in the vicinity of the autonomous vehicle, and the on-board system can compute the features of a given candidate pull-over location using the location of the detected objects.

For example, a perception system of the autonomous vehicle can detect two vehicles in the vicinity of the autonomous vehicle that are near the target pull over location. The perception system can calculate the space between the two vehicles using the locations of the two vehicles. The calculated space between the two vehicles can be used to determine features of a candidate pull-over location that is between the two vehicles.

In some implementations, the machine learning model can be a binary classification model. The likelihood score can be a probability that the candidate pull-over location is an optimal location for the autonomous vehicle to pull-over.

The features of a candidate pull-over location can include one or more features that compare the candidate pull-over location to the target pull-over location because it can be more desirable to pull over to a location that is closer to the target pull-over location. In some implementations, the one or more features that compare a candidate pull-over location to the target pull-over location can include a distance from the candidate pull-over location to the target pull-over location.

In some implementations, the features of a candidate pull-over location can include a distance from the candidate pull-over location to an edge of the roadway. In some situations, vehicles are not permitted to pull over to a location that is far away from the edge of the roadway than a predetermined distance. In some situations, it may not be safe to pull over at the location that is far away from the edge of the roadway than a predetermined distance because stopping at the location may impact on-going vehicles. Therefore, it may be desirable to pull over to a location that is closer to the edge of the roadway, e.g., closer to the curb of the roadway.

In some implementations, the features of a candidate pull-over location can include one or more features that each measures a distance from the candidate pull-over location to a corresponding type of road feature at which vehicles are not permitted to stop. The autonomous vehicle can obtain information of the road features at which vehicles are not permitted to stop, e.g., a fire hydrant, a driveway of a private property, and so on. Usually, vehicles are not permitted to stop within a range from these road features. For example, vehicles are not permitted to stop or park within 20 meters from a fire hydrant. Therefore, it may be desirable to pull over to a location that is away from the road features at which vehicles are not permitted to stop.

In some implementations, the features of a candidate pull-over location can include a distance from the candidate pull-over location to a driveway. For example, the distance from the candidate pull-over location to a driveway can be 0 if the candidate pull-over location is within a driveway. The distance can be NONE if there is no driveway near the candidate pull-over location. In some implementations, the features of a candidate pull-over location can include a distance from the candidate pull-over location to an unmapped driveway that is not currently mapped in a map of the environment.

In some implementations, the features of a candidate pull-over location can include a distance from the candidate pull-over location to a fire hydrant. In some implementations, the features of a candidate pull-over location can include a distance from the candidate pull-over location to a crosswalk.

In some implementations, the features of a candidate pull-over location can include one or more features that each measures a position of the autonomous vehicle if the autonomous vehicle pulls over at the candidate pull-over location. It can be desirable to pull over to a location where less maneuvering is required. It can also be desirable to pull over to a location where the vehicle has less impact on the on-going traffic while the vehicle is pulling over to the location. It can also be desirable to pull over to a location where the vehicle has less impact on the on-going traffic after the vehicle is pulled over to the location. In some implementations, the system can determine the position of the autonomous vehicle if the autonomous vehicle pulls over at the candidate pull-over location by determining the best position the autonomous vehicle can reach given that the vehicle maintains at least a threshold buffer from other vehicles and objects in the roadway. Here, the best position can be a position that best satisfies certain criteria, e.g., closest to the candidate location, most closely aligned with a parking regulation or a pull-over/stopping regulation, and so on.

For example, referring back to FIG. 2, pulling over to the candidate pull-over location 210 requires less maneuvering because there is a large space between parked vehicles 204 and 206. The autonomous vehicle 200 can directly drive into the candidate pull-over location 210. On the contrary, pulling over to the candidate pull-over location 212 may require driving back and forth, or even parallel parking, because there is a limited space between the parked vehicles 206 and 208.

As another example, while pulling over to the candidate pull-over location 210, the autonomous vehicle 200 can have almost no impact on the on-going vehicle because the autonomous vehicle 200 can drive to the candidate pull-over location 210 directly. After the autonomous vehicle 200 is pulled over at the candidate pull-over location 210, the autonomous vehicle may have no impact on the on-going vehicle because the autonomous vehicle can pull over sufficiently close to the curb and there can be enough space for the on-going vehicles to pass by the autonomous vehicle 200 at the candidate pull-over location 210.

In some implementations, the features of a candidate pull-over location can include an angle of the autonomous vehicle relative to an edge of the roadway if the autonomous vehicle pulls over at the candidate pull over location. For example, referring back to FIG. 2, while pulling over to the candidate pull-over location 210, the angle of the autonomous vehicle relative to an edge of the roadway can be relatively small, e.g., 20 degrees. While pulling over to the candidate pull-over location 212, the angle of the autonomous vehicle relative to an edge of the roadway can be relatively large, e.g., 45 degrees.

In some implementations, the features of a candidate pull-over location can include an angle of the autonomous vehicle relative to a baseline if the autonomous vehicle pulls over at the candidate pull over location, and the baseline is a line where the autonomous vehicle drives without pulling over. For example, referring back to FIG. 2, a baseline can be a line where the autonomous vehicle 200 would normally drive on the roadway 201 without pulling over, e.g., approximately the middle line of the lane on the roadway 201. While pulling over to the candidate pull-over location 210, the angle of the autonomous vehicle relative to the baseline can be relatively small, e.g., 20 degrees. While pulling over to the candidate pull-over location 212, the angle of the autonomous vehicle relative to the baseline can be relatively large, e.g., 45 degrees.

In some implementations, the features of a candidate pull-over location can include a lateral distance from a pull-over location to a baseline. The pull-over location can be a location while the autonomous vehicle is pulling over to the candidate pull-over location to arrive at a pulled-over location that is as close to an edge of the roadway as possible. The baseline is a line where the autonomous vehicle drives without pulling over. A large lateral distance can indicate that the autonomous vehicle can pull over far away from the baseline and can have less impact on the on-going vehicles while the autonomous vehicle is pulling over to the candidate pull-over location.

For example, in order to pull over to a location that is as close to an edge of the roadway as possible, the autonomous vehicle might need to perform parallel parking. While performing the parallel parking, the autonomous vehicle might need to start at a pull-over location that is next to a currently parked vehicle. The lateral distance from the pull-over location to the middle line of the lane where vehicles drive through can be a small number, indicating that pulling over at the candidate pull-over location can have a significant impact on the on-going vehicles, e.g., other vehicles might need to stop and wait.

In some implementations, the features of a candidate pull-over location can include a width of a corridor that other vehicles on the roadway pass the autonomous vehicle after the autonomous vehicle is pulled over at the candidate pull-over location. A bigger corridor width can indicate that it is easier for the other vehicles to pass the pulled over autonomous vehicle. A smaller corridor width can indicate that it is more difficult or sometimes impossible for the other vehicles to pass the pulled over autonomous vehicle.

In some implementations, the features of a candidate pull-over location can include data indicating whether the autonomous vehicle is double parked after the autonomous vehicle is pulled over at the candidate pull-over location. For example, the candidate pull-over location can be next to another vehicle that is already parked. If the autonomous vehicle pulls over at the candidate pull-over location, the autonomous vehicle can be double parked, which may impact the on-going traffic, or may not be permitted in some situations.

The system selects, using the respective likelihood scores, one of the candidate pull-over locations as an actual pull-over location for the autonomous vehicle (308). For example, the system can select the candidate pull-over location that corresponds to the highest likelihood score as the actual pull-over location.

In some implementations, the system can process features of two or more candidate pull-over locations using the machine learning model to select an actual pull-over location for the autonomous vehicle. The machine learning model can be trained to process context information of the neighboring candidate pull-over locations and to generate likelihood scores for the two or more candidate pull-over locations.

Figure 4:
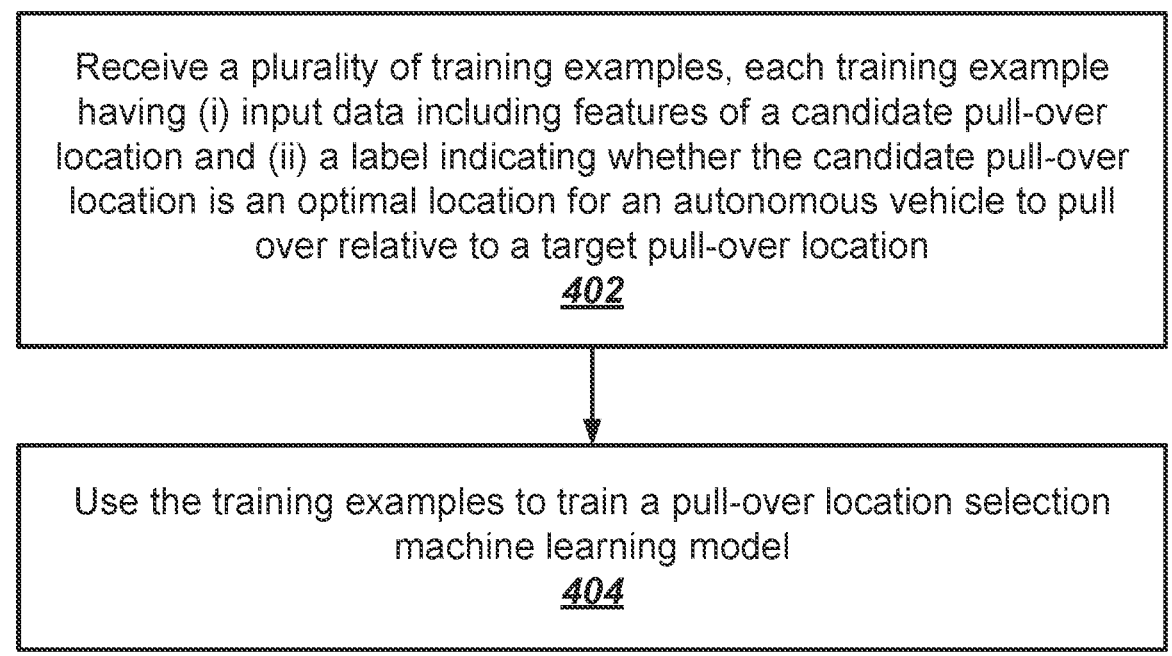
FIG. 4 is a flow chart of an example process for training a pull-over location selection machine learning model.

FIG. 4 is a flow chart of an example process 400 for training a pull-over location selection machine learning model. The process will be described as being performed by an appropriately programmed neural network system, e.g., the training system 110 of FIG. 1.

The system receives a plurality of training examples (402). Each training example can have (i) input data including features of a candidate pull-over location, and (ii) a label indicating whether the candidate pull-over location is an optimal location for an autonomous vehicle to pull over relative to a target pull-over location.

As discussed above, the features of the candidate pull-over location can include features that indicate whether vehicles are permitted to stop at the candidate pull-over location, whether it is easy to pull over at the candidate pull-over location, the level of impact on the on-going traffic during or after pulling over to the candidate pull-over location, whether the candidate pull-over location is close to the target pull-over location, and so on.

A label for each training example can be generated by human labelers. The human labelers can inspect a scene of a roadway that an autonomous vehicle is travelling on, and can determine one or more optimal pull-over locations that a human driver might want to pull over relative to the target pull-over location. For example, an optimal pull-over location can be a location that a human driver can easily pull over close to the curb, without parallel parking maneuvering, and is within 35 meters from the target pull-over location.

In some implementations, the system can use bounding boxes to indicate a location range of the road that includes one or more optimal pull over locations that a human driver might want to pull over relative to the target pull-over location. Each bounding box can be indicated by two sets of coordinates, e.g., the coordinates of the upper left corner and the lower right corner of the bounding box. The system can determine the label for a candidate pull-over location by comparing the candidate pull-over location to the bounding box. For example, if a candidate pull-over location is inside the bounding-box or the middle portion of the bounding-box, the system can determine that the candidate pull-over location is an optimal pull-over location, e.g., the label can be TRUE. If a candidate pull-over location is outside the bounding-box or the middle portion of the bounding-box, the system can determine that the candidate pull-over location is not an optimal pull-over location, e.g., the label can be FALSE.

In some implementations, the size of an autonomous vehicle can be included in the bounding box that indicates the best location range. For example, the location range can have a minimum size, e.g., a minimum size of 9 meters. When there is no empty curb more than the minimum size, the human labelers may select the longest empty curb, and the longest empty curb may overlap with double parking regions. As another example, the location range can have a maximum size, e.g., a maximum size of 15 meters. The bounding box can be labeled as close to the target pull-over location as possible.

In some implementations, the system can generate waypoints on the roadway at a predetermined interval, e.g., 0.5 meters. The human labelers can generate the labels by selecting the waypoints where a human driver might want to pull over relative to the target pull-over location.

The system uses the training examples to train a pull-over location selection machine learning model (404). The system can generate, for each candidate pull-over location in the training examples, a likelihood score that represents a predicted likelihood that the candidate pull-over location is an optimal location for the autonomous vehicle to pull-over.

The system can compare the likelihood scores to the labels in the training examples. The system can calculate a loss which can measure the difference between the likelihood scores and the labels in the training examples. The loss can include a classification loss, e.g., a cross-entropy loss.

The system can then generate updated model parameter values based on the loss by using an appropriate updating technique, e.g., stochastic gradient descent with backpropagation. The system can then update the collection of model parameter values using the updated model parameter values.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
    obtaining data specifying a target pull-over location for an autonomous vehicle travelling on a roadway;
    identifying a plurality of candidate pull-over locations in a vicinity of the target pull-over location;
    for each of the plurality of candidate pull-over locations, processing, using a machine learning model, an input that comprises features of the candidate pull-over location that comprise one or more features that each predicts a position of the autonomous vehicle if the autonomous vehicle pulls over at the candidate pull-over location to generate a respective likelihood score for the candidate pull-over location, each likelihood score representing a predicted likelihood that the candidate pull-over location is an optimal location for the autonomous vehicle to pull-over;
    selecting, using the respective likelihood scores, one of the candidate pull-over locations as an actual pull-over location for the autonomous vehicle; and
    controlling the autonomous vehicle based on the actual pull-over location.

2. The method of claim 1, further comprising: generating the plurality of candidate pull-over locations by identifying a plurality of waypoints within a region in a vicinity of the autonomous vehicle.

3. The method of claim 1, wherein the features of the candidate pull-over location comprise a distance from the candidate pull-over location to the target pull-over location.

4. The method of claim 1, wherein the features of the candidate pull-over location comprise a distance from the candidate pull-over location to an edge of the roadway.

5. The method of claim 1, wherein the features of the candidate pull-over location comprises one or more features that each measures a distance from the candidate pull-over location to a corresponding type of road feature at which vehicles are not permitted to stop.

6. The method of claim 5, wherein the one or more features that each measures the distance from the candidate pull-over location to the corresponding type of road feature at which vehicles are not permitted to stop comprise: a distance from the candidate pull-over location to a driveway.

7. The method of claim 6, wherein the driveway is an unmapped driveway.

8. The method of claim 5, wherein the one or more features that each measures the distance from the candidate pull-over location to the corresponding type of road feature at which vehicles are not permitted to stop comprise: a distance from the candidate pull-over location to a fire hydrant.

9. The method of claim 5, wherein the one or more features that each measures the distance from the candidate pull-over location to the corresponding type of road feature at which vehicles are not permitted to stop comprise: a distance from the candidate pull-over location to a crosswalk.

10. The method of claim 1, wherein the one or more features that each predicts the position of the autonomous vehicle if the autonomous vehicle pulls over at the candidate pull-over location comprise: an angle of the autonomous vehicle relative to an edge of the roadway if the autonomous vehicle pulls over at the candidate pull-over location.

11. The method of claim 1, wherein the one or more features that each predicts the position of the autonomous vehicle if the autonomous vehicle pulls over at the candidate pull-over location comprise: an angle of the autonomous vehicle relative to a baseline if the autonomous vehicle pulls over at the candidate pull-over location, wherein the baseline is a line where the autonomous vehicle drives without pulling over.

12. The method of claim 1, wherein the one or more features that each predicts the position of the autonomous vehicle if the autonomous vehicle pulls over at the candidate pull-over location comprise: a lateral distance from an initial pull-over location to a baseline, wherein the initial pull-over location is a location while the autonomous vehicle is pulling over to the candidate pull-over location to arrive at a pulled-over location that is as close to an edge of the roadway as possible, wherein the baseline is a line where the autonomous vehicle drives without pulling over.

13. The method of claim 1, wherein the one or more features that each predicts the position of the autonomous vehicle if the autonomous vehicle pulls over at the candidate pull-over location comprise: a width of a corridor that other vehicles on the roadway pass the autonomous vehicle after the autonomous vehicle is pulled over at the candidate pull-over location.

14. The method of claim 1, wherein the one or more features that each predicts the position of the autonomous vehicle if the autonomous vehicle pulls over at the candidate pull-over location comprise: data indicating whether the autonomous vehicle is double parked after the autonomous vehicle is pulled over at the candidate pull-over location.

15. The method of claim 1, wherein the machine learning model is a binary classification model.

16. A system comprising one or more computers and one or more storage devices storing instructions that when executed by the one or more computers cause the one or more computers to perform operations comprising:
    obtaining data specifying a target pull-over location for an autonomous vehicle travelling on a roadway;
    identifying a plurality of candidate pull-over locations in a vicinity of the target pull-over location;
    for each of the plurality of candidate pull-over locations, processing, using a machine learning model, an input that comprises features of the candidate pull-over location that comprise one or more features that each predicts a position of the autonomous vehicle if the autonomous vehicle pulls over at the candidate pull-over location to generate a respective likelihood score for the candidate pull-over location, each likelihood score representing a predicted likelihood that the candidate pull-over location is an optimal location for the autonomous vehicle to pull-over;

selecting, using the respective likelihood scores, one of the candidate pull-over locations as an actual pull-over location for the autonomous vehicle; and controlling the autonomous vehicle based on the actual pull-over location.

17. The system of claim 16, the operations further comprise: generating the plurality of candidate pull-over locations by identifying a plurality of waypoints within a region in a vicinity of the autonomous vehicle.

18. The system of claim 16, wherein the features of the candidate pull-over location comprise a distance from the candidate pull-over location to the target pull-over location.

19. One or more non-transitory computer-readable storage media storing instructions that when executed by one or more computers cause the one or more computers to perform operations comprising:

obtaining data specifying a target pull-over location for an autonomous vehicle travelling on a roadway;

identifying a plurality of candidate pull-over locations in a vicinity of the target pull-over location;

for each of the plurality of candidate pull-over locations, processing, using a machine learning model, an input that comprises features of the candidate pull-over location that comprise one or more features that each predicts a position of the autonomous vehicle if the autonomous vehicle pulls over at the candidate pull-over location to generate a respective likelihood score for the candidate pull-over location, each likelihood score representing a predicted likelihood that the candidate pull-over location is an optimal location for the autonomous vehicle to pull-over;

selecting, using the respective likelihood scores, one of the candidate pull-over locations as an actual pull-over location for the autonomous vehicle; and controlling the autonomous vehicle based on the actual pull-over location.

20. The system of claim 16, wherein the features of the candidate pull-over location comprise a distance from the candidate pull-over location to an edge of the roadway.

* * * * *